United States Patent [19]
Hopkinson

[11] Patent Number: 5,261,284
[45] Date of Patent: Nov. 16, 1993

[54] NON-INTERACTING ENCLOSURE DESIGN FOR CORIOLIS MASS FLOW METERS

[75] Inventor: Allen B. Hopkinson, San Jose, Calif.

[73] Assignee: Exac Corporation, San Jose, Calif.

[21] Appl. No.: 960,068

[22] Filed: Oct. 13, 1992

[51] Int. Cl.$^5$ .............................................. G01F 1/84
[52] U.S. Cl. .................................................. 73/861.37
[58] Field of Search ............. 73/861.37, 861.38, 32 A

[56] References Cited
U.S. PATENT DOCUMENTS

| | | | |
|---|---|---|---|
| 3,329,019 | 7/1967 | Sipin | 73/861.37 |
| 4,803,867 | 2/1989 | Dahlin | 73/32 A |
| 4,962,671 | 10/1990 | Stansfeld et al. | 73/861.37 |

*Primary Examiner*—Herbert Goldstein
*Attorney, Agent, or Firm*—Claude A. S. Hamrick; Harold T. Fujii

[57] ABSTRACT

A non-interacting enclosure design for Coriolis mass flow meters including at least one endcap that is rigidly affixed to the metering assembly or the inlet/outlet conduits, and an enclosing sleeve that is expansively and vibrationally isolated from the endcap(s) so that external environmental influences affecting the enclosure are not transmitted to the metering section.

4 Claims, 2 Drawing Sheets

NON-INTERACTING ENCLOSURE DESIGN FOR CORIOLIS MASS FLOW METERS

BACKGROUND OF THE INVENTION

1. Field of the Invention

The present invention relates generally to Coriolis type mass flowmeters, and more particularly to an improved enclosure for such a device that, in interacting with the surrounding thermal, stress, and vibrational environments, does not affect operation of the meter.

2. Brief Description of the Prior Art

Coriolis-effect type mass flow rate meters are well known in the prior art and provide an accurate and efficient means of determining the mass flow rate of fluids and/or liquid-solid slurries flowing through a pipeline or conduit. Coriolis mass flowmeters are typically shielded from the ambient environment, corrosives, etc. by an enclosure. Such flowmeter enclosures are typically fabricated from sheet metal (or other suitable material) that is welded, or otherwise securely attached, to the meter support.

As depicted in FIG. 1 which illustrates at 10 a Coriolis flowmeter apparatus including a flowmeter shown generally at 12 and an enclosure 14, fluid passes through the flowmeter 12 in a direction as illustrated by arrows 13 and 15. The apparatus includes an input flange 16, an input conduit 17, the flowmeter metering section 12, a support bracket 13, an output conduit 19, and an output flange 18. The enclosure 14 includes an upstream endcap 22, a downstream endcap 24, and a sleeve 26 which is welded or otherwise affixed to the bracket 13 a suggested at 27.

The endcaps 22 and 24 are welded or otherwise rigidly secured to the sleeve 14. The endcaps are also rigidly secured to the inlet and outlet conduits by means of nipples 28 and 29 which are welded or brazed thereto. The necessary electronics for monitoring the vibrations and for driving the conduit sections are not shown.

There are several problems encountered with the enclosure 14 associated with the Coriolis flowmeter 12. First, pipeline vibrations can excite the enclosure 14 which, in turn, interacts vibrationally with the metering section, causing flow measurement errors.

A second problem is that axial stresses may be caused by changes in fluid temperature, changes in ambient temperature, and the differential thermal expansion of the enclosure sleeve 14 relative to the metering section and support bracket. These stresses adversely change the vibrational characteristics of the flowmeter and its enclosure, thereby causing flow measurement errors.

Transverse and axial stress loadings may also be impressed on the metering section from mechanical stresses resulting from the mechanical mounting of the apparatus to the pipeline. These stresses can alter the modal vibration characteristics of the enclosure 14 with the result that the enclosure adversely interacts with the sensitive portion of the metering assembly, thereby causing mass flow measurement and zero offset errors.

While it may be difficult to completely eliminate such detrimental influences, problems associated with the interaction between the sensitive portion of the metering assembly and its surrounding enclosure can be improved in accordance with the present invention.

SUMMARY OF THE PRESENT INVENTION

It is therefore an object of the present invention to provide for an enclosure design that avoids or minimizes mass flow rate measurement errors resulting from pipeline vibrations, thermally induced axial stresses, or transverse and axial stress loadings.

Another object of the present invention is to provide an enclosure that is free to expand thermally, change its vibrational properties, and reduce the stresses which are normally transmitted into the sensitive portion of the flowmeter.

Yet another object of the present invention is to reduce the costs associated with the fabrication and assembly of the enclosure of a Coriolis mass flowmeter.

Briefly, a preferred embodiment of the present invention includes a Coriolis flowmeter having a substantially non-interacting enclosure assembly. The enclosure assembly includes at least one endcap that is rigidly affixed to the metering assembly or the inlet/outlet conduits, and an enclosing sleeve that is expansively and vibrationally isolated from the endcap(s) so that external environmental influences affecting the enclosure are not transmitted to the metering section.

A primary advantage of the present invention is that it avoids or minimizes the adverse interactions between the enclosure and the sensitive portion of any Coriolis type flowmeter.

Another advantage of the present invention is that the enclosure housing is attached to the meter assembly in a nonrigid manner using suitable adhesives or suitable materials that dampen vibration and also permit the enclosure housing to expand thermally relative to the metering assembly and its support.

Yet another advantage of the present invention is that it reduces the extent to which external stresses propagate into the enclosure housing and prevents the enclosure housing from adversely, vibrationally communicating with the sensitive portion of the meter.

These and other objects and advantages of the present invention will no doubt become apparent to those skilled in the art after having read the following detailed description of the preferred embodiment illustrated in the several figures of the drawing.

IN THE DRAWING

FIG. 1 illustrates a prior art Coriolis flowmeter and accompanying enclosure; and FIG. 2 sectional view of the preferred embodiment of a non-interacting enclosure assembly design for a Coriolis flowmeter.

DESCRIPTION OF THE PREFERRED EMBODIMENT

Figure 1:
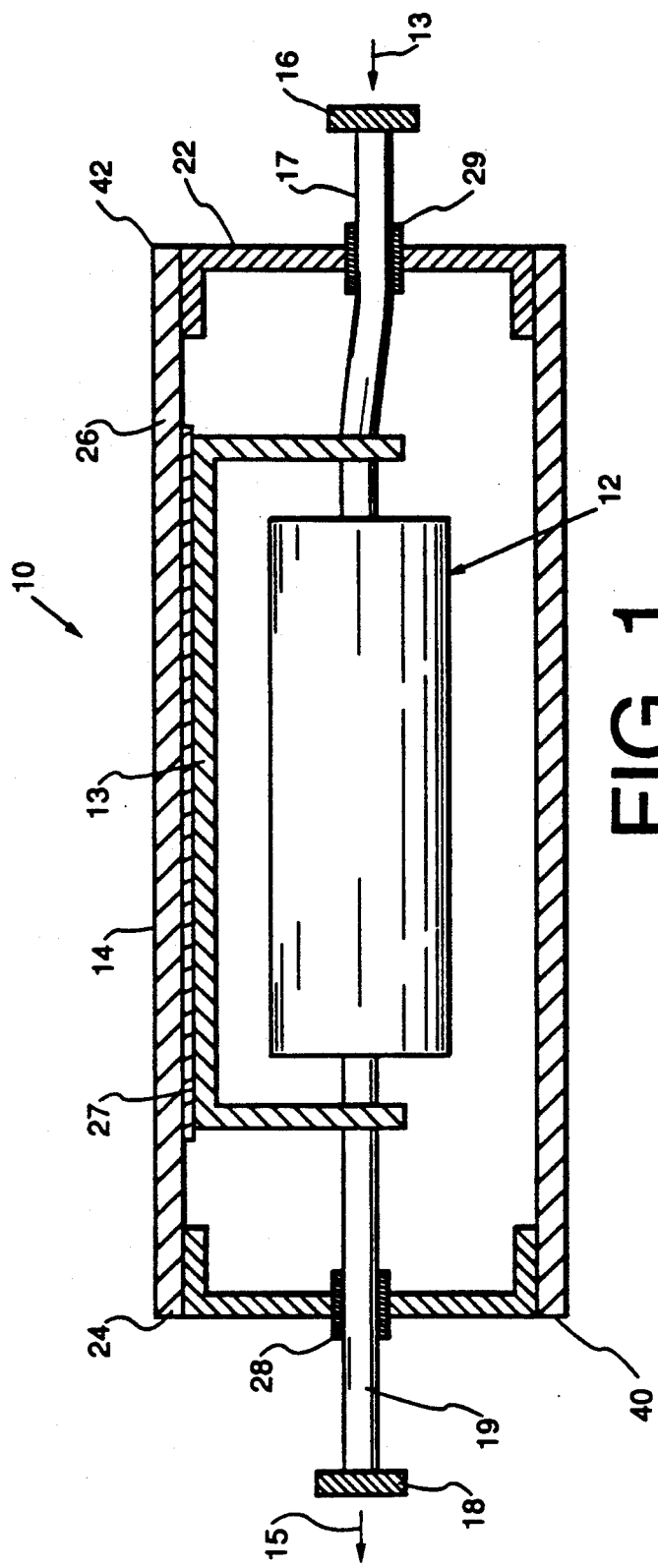
Figure 2:
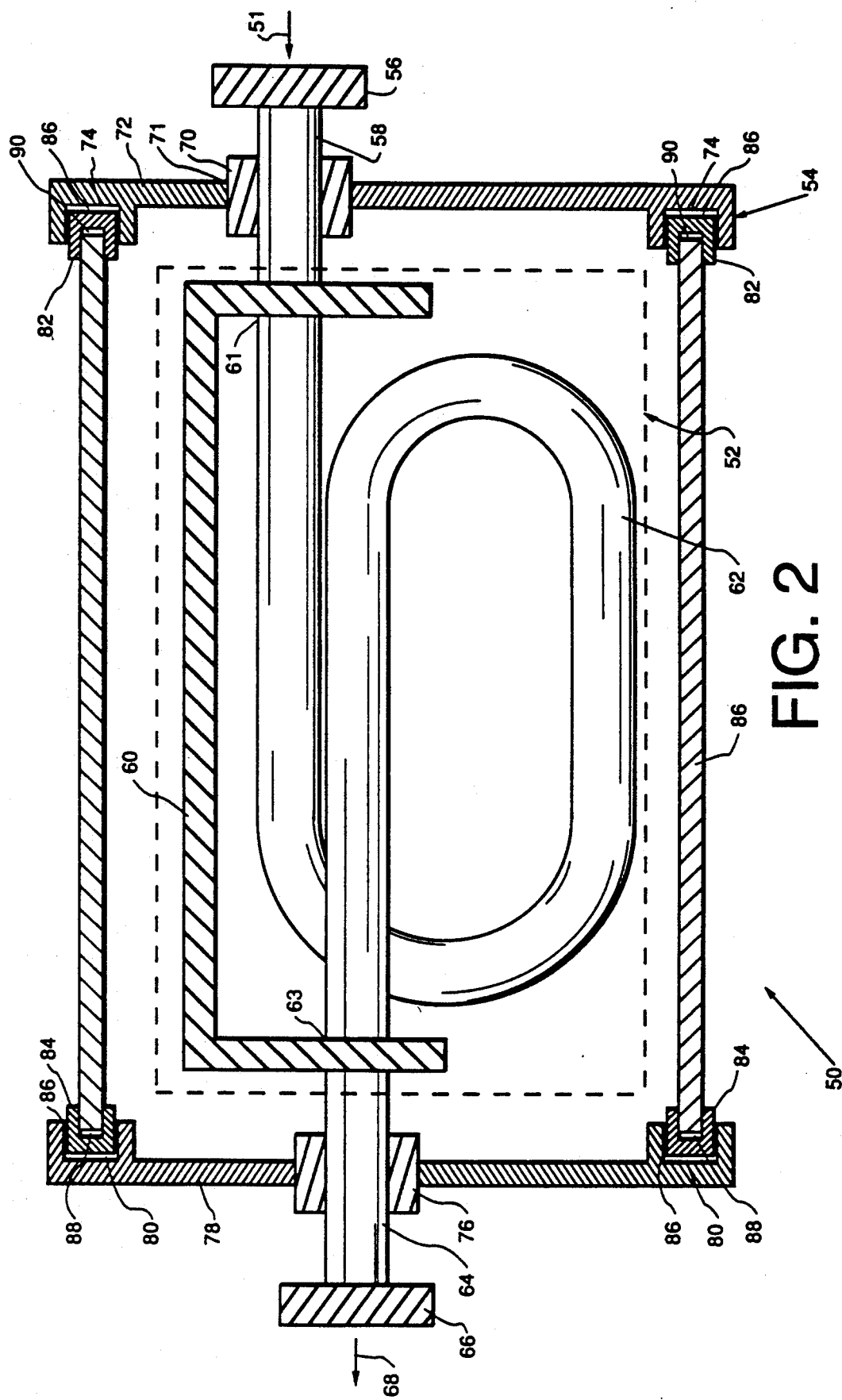

Referring now to FIG. 2 which illustrates in longitudinal cross-section a Coriolis flowmeter and non-interacting enclosure assembly in accordance with the present invention. The apparatus 50 includes a Coriolis flowmeter 52, and a non-interacting enclosure assembly 54. It will be appreciated from the figure that, although a specific configuration of Coriolis flowmeter is depicted, any other type of Coriolis flowmeter configuration could be used in accordance with the present invention.

The illustrated apparatus includes an input conduit 58, a metering section 62, and an output conduit 64. The input conduit 58 is communicatively coupled to one end of the metering section 62, while the output conduit 64 is communicatively coupled to the opposite end of the metering section 62. An input flange 56 is mechanically joined to the open end of the conduit 58, while the open end of the conduit 64 is similarly mechanically joined to an output flange 66. A rigid support bracket 60 is mechanically coupled or welded at 61 to the inlet end of to the section 62, while the opposite end of the bracket 60 is similarly connected at 63 to the outlet from the section 62.

The non-interacting enclosure assembly 54 includes an endcap nipple 70, an endcap 72, a nipple 76, an endcap 78, an enclosure sleeve 86, a resilient isolation member 82, and a resilient isolation member 84.

The upstream endcap 72 is brazed or welded to the nipple 70 at 71, and the nipple 70 is likewise affixed to conduit 58. An annular channel or recess 74 is formed along the outer periphery of endcap 72. The size of the recess 74 is chosen to accommodate the dimensions of an isolation member 82.

The downstream nipple 76 is similarly welded or brazed to the output conduit 64, and the endcap 78, in turn, is affixed to the nipple 76. An annular recess or channel 80 is formed along the periphery of the endcap 78. The recess 80 is formed so as to accommodate installation of a downstream isolation member 84.

The enclosure sleeve 86 is generally tubular in configuration and includes an open end 90 and an open end 88. The upstream isolation member 82 is disposed onto the sleeve end 90, while the downstream isolation member 84 is disposed onto the sleeve end 88. The sleeve ends 88 and 90, and associated resilient members 82 and 84, are received within the recesses 86 of each endcap.

The fabrication or installation sequence for the enclosure assembly will now be described. After the meter 52 is assembled, but before the end flanges are installed, the endcap nipples are slipped over the tube ends and welded at the appropriate locations on the conduits 58 and 64. The downstream endcap 78 is then welded to the nipple 76. The enclosure sleeve, with the fitted isolation members disposed at both ends, is then slid over the Coriolis flowmeter assembly 52 and fitted into the recess 80 formed in the endcap 78. The upstream endcap 72 is then slipped over the tube 58 and nipple 70 and fitted onto the isolation member 82 disposed on the sleeve end 90. The endcap 72 is then welded to the nipple 70. Finally, the flanges 56 and 66 are welded to the input and output conduits 58 and 64. It will be appreciated that, in the alternative, the enclosure could be assembled starting at the upstream end.

In operation, the media to be measured enters the assembly 50 in the direction of an arrow 51 and exits the assembly 50 in the direction of an arrow 68. The enclosure assembly 54, which is exposed to the ambient environment, may expand and contract in reaction to the thermally induced environment. Because of the isolation members 84 and 82, the enclosure sleeve is free to expand or contract without the associated forces being transmitted into the respective endcap members, and consequently into the flowmeter assembly. The otherwise adverse interactions between the enclosure and the sensitive portions of the flowmeter are thus avoided or reduced because the enclosure housing is attached to the meter assembly in a non-rigid manner using suitable adhesives or materials that dampen vibration and also permit the enclosure housing to expand or contract thermally relative to the metering assembly and its support without transferring stress. This type of mounting also prevents external stresses from propagating into the enclosure housing and prevents the enclosure from vibrationally communicating with the sensitive portion of the meter.

Although a Coriolis flowmeter and non-interacting enclosure assembly featuring a preformed isolation member has been disclosed as the preferred embodiment, it will be appreciated that in the alternative, a non-interacting enclosure assembly can utilize a non-preformed isolation member. For example, the isolation member may be in a semi-fluid state injected into the clearance space 86 formed between the recess channel and the corresponding enclosure sleeve upstream and downstream ends. When the isolation member cures to a solid state, it provides a consistent and complete seal about the sleeve ends. In the preferred embodiment, the isolation members are made of an aerospace grade RTV-157 or equivalent.

Although preferred and alternate embodiments of the present invention have been disclosed above, it will be appreciated that numerous alterations and modifications thereof will no doubt become apparent to those skilled in the art after having read the above disclosures. It is therefore intended that the following claims be interpreted as covering all such alterations and modifications as fall within the true spirit and scope of the invention.

What is claimed is:

1. In a Coriolis type device for measuring flow rate or density of a flowable media, and including a flowmetering section in hydraulic communication with an input conduit and an output conduit, and contained within an external enclosure, an improved enclosure comprising:

first end plate means installed on said input conduit;

second end plate means installed on said output conduit;

sleeve means disposed between said first and second end plate means and about said flowmetering section;

first isolation means for resiliently attaching one end of said sleeve means to said first end plate means; and second isolation means for resiliently attaching the other end of said sleeve means to said second end plate means;

whereby said sleeve and said first and second isolation means form an air and water tight envelope housing said flowmetering section, and Which dampens externally induced vibrations, and thermally expands and contracts under environmental influences without materially stressing said flowmetering section.

2. In a Coriolis type device as set forth in claim 1, wherein said first and second isolation means includes
pre-formed ring-like structures having a generally U-shaped cross-section adapted to fittingly engage the ends of said sleeve means.

3. In a Coriolis type device set forth in claim 2, wherein said first and second end plate means include
facing annular recesses adapted to matingly receive said ring-like structures and the associated ends of said sleeve means.

4. In a Coriolis type device as set forth in claim 1, wherein said first and second isolation means is formed by a flowable non-rigid setting adhesive.

* * * * *